Figure 1:
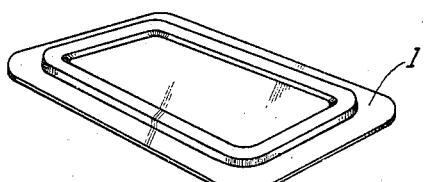

Feb. 11, 1941. J. W. SIMMONS 2,231,032
METHOD OF MAKING CONTAINERS
Filed Feb. 23, 1939  2 Sheets-Sheet 1

INVENTOR.
John W. Simmons
BY Hull, Brock & West
ATTORNEYS.

Feb. 11, 1941.  J. W. SIMMONS  2,231,032
METHOD OF MAKING CONTAINERS
Filed Feb. 23, 1939  2 Sheets-Sheet 2
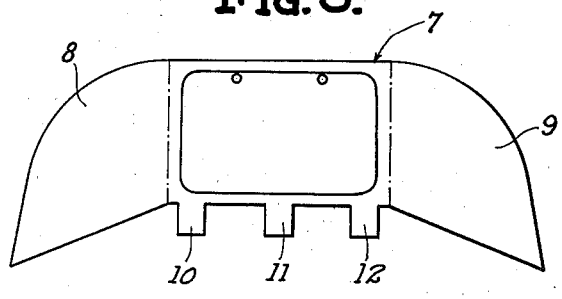
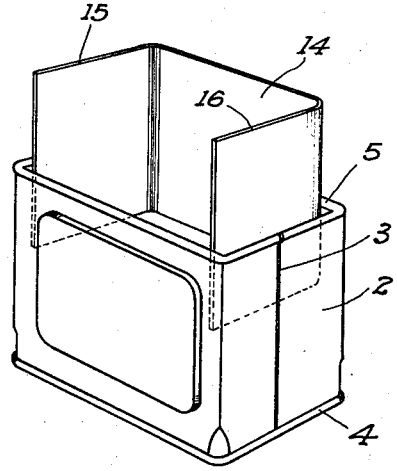
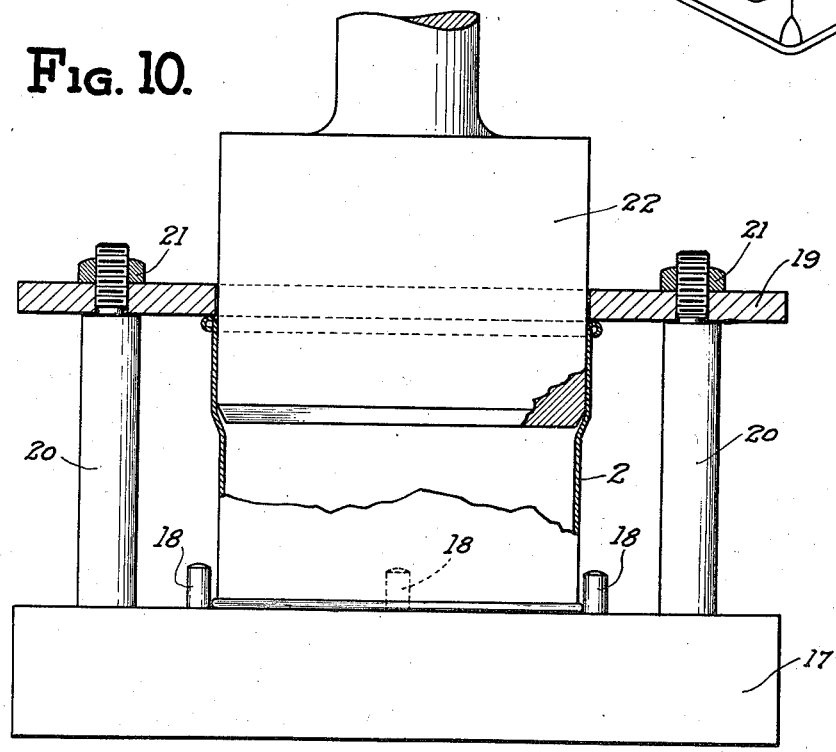
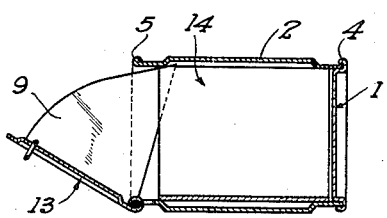
INVENTOR.
John W. Simmons
BY Hull, Brock & West
ATTORNEYS.

Patented Feb. 11, 1941

2,231,032

UNITED STATES PATENT OFFICE 2,231,032

METHOD OF MAKING CONTAINERS

John W. Simmons, Cleveland Heights, Ohio

Application February 23, 1939, Serial No. 257,843

7 Claims. (Cl. 113—120)

This invention relates to a method of making a container.

The usual and customary method of manufacturing boxes of this type is to stamp and form the blanks into the proper shape by a series of blanking and forming dies and then to assemble the blanks so formed manually and weld the various parts together. The assembled unit is then sprayed or painted and baked.

The disadvantage of the method referred to is the slowness of production made necessary because of the fact that the parts have to be manually assembled and welded together. Another disadvantage of such method is that it is impossible as a practical matter to weld surfaces that have been finished or which have a coating applied thereto such as lithographing, printed and lacquered coatings.

The type of box to which this invention relates is known to the trade as a "hopper front box" which has a door which is hingedly mounted on the front of the box and is so shaped as to provide a hopper disposed in front of the box when the door is opened. Such boxes are made in such a manner that when a number of boxes are stacked one on top of another, the contents of each box is accessible without disturbing the others.

According to my method of manufacturing and assembling boxes, I am able to take full advantage of modern automatic and semi-automatic machines which are old and well known and are now used in the production of cans, thereby greatly reducing the cost of the tools and dies necessary.

One object of my invention is to provide a box of the character described which can be made and assembled with a small number of operations and with a minimum cost for the tools and dies necessary to make the box.

Another object of my invention is to provide a box which is open at one end and has mounted thereon a hopper-like door which neatly fits the open end of the box and which is provided with a liner which is loosely mounted in the box and so disposed that it cooperates with the opposite side walls of the box to define a pair of narrow compartments which receive therein the flanges which form the side walls of the hopper-like door.

According to my method of making and assembling the different parts of the box, the bottom of the box is generally rectangular in shape and has oval or rounded corners. The side walls of the box are also generally oval in shape and have an overturned bead or curl at the upper edge thereof to reinforce the same. In order to properly close the box and to have a neat fit, it is necessary that the upper or open end of the box be made rectangular in shape and with square corners so that the hopper-like door will properly fit the same. I make use of a suitable tool which squares up the interior of the upper end of the box so as to obtain a proper fit between the door and the box.

A further object of the invention is to provide a box of the character described which contains a minimum number of parts and a method of assembling such parts in such a manner that the number of tools or dies required is reduced to a minimum, thereby greatly decreasing the cost of production of such boxes.

Figure 2:
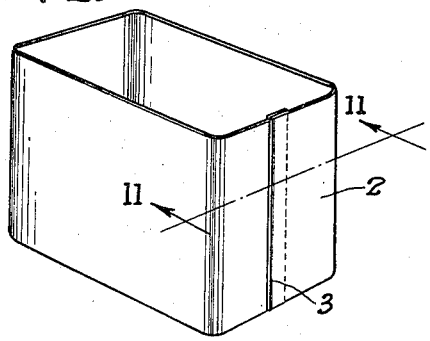
Figure 3:
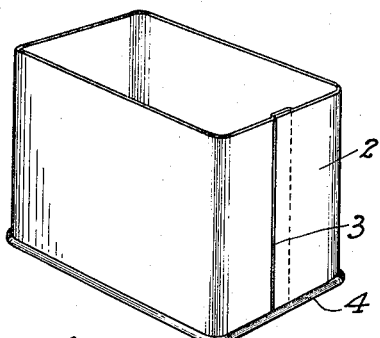
Figure 4:
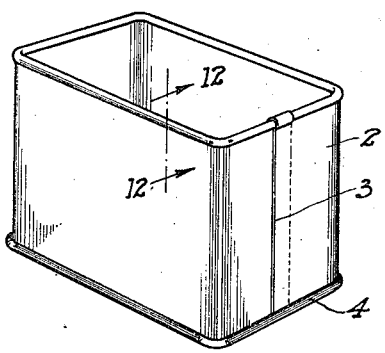
Figure 5:
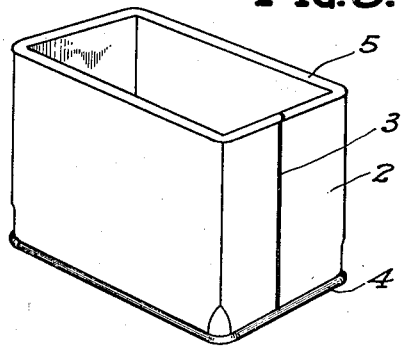
Figure 6:
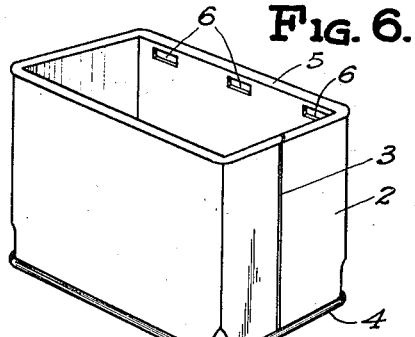
Figure 7:
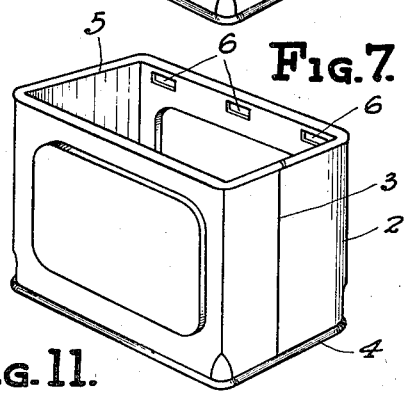
Figure 11:
Figure 12:

Further and more limited objects of the invention will appear as the description proceeds and by reference to the accompanying drawings in which the several steps of making and assembling the box are disclosed. Fig. 1 is a perspective view showing the bottom of the box after it has been blanked and formed; Fig. 2 is a perspective view showing the boxed side walls; Fig. 3 is a perspective view showing the boxed side walls having the bottom secured thereto; Fig. 4 is a perspective view of the box showing the curled edge or bead formed at the open upper end thereof; Fig. 5 is a perspective view showing the box as it will appear after having the upper end thereof squared; Fig. 6 is a perspective view of the box after the openings have been formed therein along one edge to permit the hopper-like door to be secured thereto; Fig. 7 is a perspective view of the box after the side walls have been embossed; Fig. 8 is a plan view of the hopper-like door after it has been blanked; Fig. 9 is a view showing the liner partially inserted into the box; Fig. 10 is a view showing the punch or tool for squaring up the upper end of the box; Fig. 11 is a sectional view on the line 11—11 of Fig. 2; Fig. 12 is a sectional view on the line 12—12 of Fig. 4; and Fig. 13 is a sectional view of the finished box.

Referring now to the drawings, the reference character 1 designates the base or bottom of the box after it has been formed. The side walls 2 of the box are formed from a single piece of metal the edges of which are folded over and interlocked with each other as shown at 3. The bottom of the box is secured to the side walls by having the edges thereof turned over to form a bead indicated by the reference character 4. The upper edges of the side walls of the box have a bead or curl 5 formed thereon which serves to strengthen and to increase the rigidity of the box. A plurality of openings 6 which are rectangular in shape are formed adjacent the upper edge of one of the side walls.

The hopper-like door is formed from a single piece of metal and is made from a blank 7 which is of the shape shown in Fig. 8. The blank has a pair of flanges 8 and 9 and a plurality of projecting portions 10, 11 and 12 which serve to provide a hinge for the door in a manner to be hereinafter described. The side flanges are bent outwardly and form a door indicated generally by the reference character 13. To secure the door to the box the projections 10, 11 and 12 are inserted into the opening 6 and bent downwardly so as to provide a pivotal mounting therefor. Disposed within the box and preferably loosely arranged therein is a liner 14 which preferably consists of a single piece of metal or other suitable material bent to the shape shown in Fig. 9 and inserted into the box. The side walls 15 and 16 of the liner cooperate with the adjacent side walls of the box and provide a pair of compartments which receive therein the flanges 8 and 9. The flanges 8 and 9 are of such shape that they afford stops for limiting the outward movement of the door.

As the door must be substantially rectangular in shape, it is necessary that the upper end of the box be shaped or formed so as to obtain a neat fit. It is therefore necessary to square up the upper end of the box. An apparatus for performing this operation is illustrated in Fig. 10 and consists essentially of a base plate 17 which has thereon a plurality of positioning pins 18. Disposed above the base plate 17 is a stripper plate 19 which is spaced therefrom by suitable spacing members 20. The stripper plate is held in place by nuts 21. The reference character 22 designates a punch the lower end of which is square or rectangular in shape and is slightly smaller than the upper end of the finished box. In order to square up the box, the box is placed on the base plate in the position shown in Fig. 10 and the punch is forced into the upper end of the box which results in squaring up the upper end of the box so that the corners thereof are at substantially right angles. This operation, of course, is performed before the hopper-like door is secured in place.

In making and assembling the box, I prefer to proceed as follows, although some variation may be made in the order of steps: The first step is to form the bottom 1 of the box from a piece of flat stock which has been previously coated, finished or lithographed. The next step is to form the sides of the box from a similar piece of material by passing it through an automatic forming machine where it is formed, shaped and seamed. The adjacent edges of the side walls of the box are secured together by interlocking the complementary portions of the seams with each other and then flattening the same to hold them in place.

The next step is to assemble the base and body or side walls of the box which produces the structure shown in Fig. 3. This operation is performed in a suitable machine particularly designed for this purpose.

The next operation is to curl over or form a bead on the upper open end of the side walls of the box which operation is also performed in a suitable machine designed for that purpose. This curl or bead strengthens the box and serves also to provide a suitable hinge for the hopper-like door.

The next step is to square up the upper end of the box. This operation is performed with the apparatus hereinbefore described and illustrated in Fig. 10. The depth to which the punch 22 is inserted into the box may be varied as desired, it being necessary that only the extreme upper portion of the side walls be squared up.

The next step is to punch the slots or holes 6 in the side walls of the box although this operation may be performed before the upper edge of the box is curled over, if desired.

The next step is that of embossing either two or four sides of the body of the box in such a manner that all or a part of the side walls of the box is pressed out in such a way that it is disposed in a plane parallel with the curled-over ends of the side walls. This enables a plurality of such boxes to be stacked one on another. The method of assembling and mounting the door and liner has already been described.

One of the features of my method of forming and assembling the various parts of the box resides in the enormous saving effected in die and tool costs. I am able to make use of standard base sizes which are a standard article of manufacture thereby making it unnecessary to use different size bases. If a larger box is needed, the side walls may be made higher using the same size base and the same size door. It will therefore be seen that I can use the same size base and at very little additional cost produce a wide range in sizes of boxes. With about six size bases I can produce between fifty and seventy-five different size boxes without any additional expense for tools or dies.

It will now be clear that I have provided a box and method of making and assembling the same which will accomplish the objects of the invention as hereinbefore stated. It is to be understood that various changes may be made in the details of construction and order of steps of the method of assembly without departing from the spirit of my invention and that the embodiment of the invention herein disclosed is to be considered merely as illustrative and not in a limiting sense as the invention is limited only in accordance with the scope of the appended claims. It is contemplated that the body portion of the box may be formed of paper or fibre and have a metal base and a metal bead secured to the open upper end if desired.

Having thus described my invention, what I claim is:

1. The method of making a box of the hopper front type which comprises the steps of bending a blank into curvilinear form and securing the adjacent edges thereof together to form the side walls of the box, then securing a bottom to said side walls by bending over the adjacent edges of said side walls and bottom to form a bead extending entirely around the bottom edge thereof, then curling over outwardly the upper edges of said side walls, squaring up the corners of the open upper end of said box from the interior thereof, and forming a plurality of slots in one side of said box.

2. The method of making a light gauge sheet metal box which includes the steps of bending a sheet metal blank into a curvilinear form and securing the adjacent edges thereof together to form the side walls of the box, then securing a bottom to said side walls by bending over the adjacent edges of said side walls and bottom to form a bead, then curling over outwardly the upper edges of said side walls, then squaring up the interior corners of the open upper end of said box from the interior thereof, then forming a plurality of slots in one side of said box adjacent the upper edge thereof, then embossing the oppositely disposed side walls of said box in such a manner that substantial portions of said walls will be pressed out and disposed in substantially the same plane as the curled-over edges of the box whereby to permit a plurality of such boxes to be stacked one upon another.

3. The method of making a light weight metal container which includes the steps of bending a light gauge sheet metal blank into a curvilinear form and securing the edges thereof together to form the side walls of the container, securing a bottom member to said side walls by seaming the adjacent edges of said side walls and bottom, bending over outwardly the upper edge of said side walls to form a reinforcing bead extending about the entire periphery thereof, and subsequently squaring up the corners of the open upper end of said container from the interior thereof so as to provide interiorly disposed square corners while permitting the exterior edge of said bead to stretch whereby the open upper end of said container is shaped to receive a square closure member.

4. The method of making a generally rectangular container which includes the steps of bending a light gauge sheet metal blank into a curvilinear form and securing the edges thereof together to form the side walls of the container, securing a bottom member to said side walls, bending over outwardly the upper edge of said side walls to form a reinforcing bead extending around the corners thereof, and subsequently squaring up the corners of the open upper end of said container from the interior thereof so as to provide interiorly disposed square corners while permitting the exterior edge of said bead to stretch whereby the open upper end of said container is shaped to receive a square closure member.

5. The method of making a light weight container which includes the steps of bending a light gauge blank into curvilinear form and securing the edges thereof together to form the side walls of the container, then securing a bottom member to said side walls by seaming the adjacent edges of said side walls and bottom, then bending over outwardly the upper edge of said side walls to form a reinforcing bead extending about the periphery thereof and subsequently squaring up the interior corners of the curled upper end of the container from the interior thereof so as to provide interiorly disposed square corners while permitting the exterior edges of said curled over edge to stretch whereby the open upper end of the container is shaped to receive a square closure member.

6. The method of making a generally rectangular container which includes the steps of bending a light gauge thin metal blank into a curvilinear form and securing the edges thereof together to form the side walls of the container, securing a bottom member to said side walls, and bending over outwardly the upper edge of said side walls to form a reinforcing bead extending around the corners thereof, then squaring up the interior corners of the open upper end of the container from the interior thereof so as to provide interiorly disposed square corners while permitting the exterior edge of said bead to stretch whereby the open upper end of said container is shaped to receive a square closure member.

7. The method of making a container which comprises the steps of bending a blank into a curvilinear form and securing the edges thereof together to form the side walls of the container, securing a bottom to said side walls and bending over outwardly the upper edge of said side walls to form a reinforcing bead extending about the entire periphery thereof, then squaring up the corners of the open upper end of the container from the interior thereof so as to provide interiorly disposed square corners while permitting the exterior edge of said bead to stretch around said corners.

JOHN W. SIMMONS.